(12) United States Patent
Beaurain et al.

(10) Patent No.: US 8,084,123 B2
(45) Date of Patent: Dec. 27, 2011

(54) PROCESS FOR PREPARING A SOL-GEL SOLUTION AND USE OF THIS SOLUTION TO FORM A COATING TO PROTECT A SUBSTRATE HAVING A METAL SURFACE

(75) Inventors: Laurence Beaurain, Tours (FR); Philippe Prene, Tours (FR); Yves Montouillout, Le Bardon (FR); Philippe Belleville, Tours (FR)

(73) Assignee: Commissariat a l'Energie Atomique, Paris (FR)

( * ) Notice: Subject to any disclaimer, the term of this patent is extended or adjusted under 35 U.S.C. 154(b) by 1030 days.

(21) Appl. No.: 11/885,328

(22) PCT Filed: Mar. 1, 2006

(86) PCT No.: PCT/FR2006/050184
§ 371 (c)(1),
(2), (4) Date: Aug. 30, 2007

(87) PCT Pub. No.: WO2006/092536
PCT Pub. Date: Sep. 8, 2006

(65) Prior Publication Data
US 2008/0193746 A1 Aug. 14, 2008

(30) Foreign Application Priority Data
Mar. 1, 2005 (FR) ...................................... 05 50538

(51) Int. Cl.
*C09K 3/10* (2006.01)
*B01J 13/00* (2006.01)
*C08J 3/03* (2006.01)
*C08J 3/09* (2006.01)

(52) U.S. Cl. ......... 428/332; 516/99; 516/102; 516/104; 516/98; 516/109; 427/299; 427/372.2; 427/508; 428/336; 428/457

(58) Field of Classification Search .................... 516/98, 516/99, 102, 104; 427/299, 372.2, 508; 428/332, 428/336, 457, 508
See application file for complete search history.

(56) References Cited

U.S. PATENT DOCUMENTS

| | | |
|---|---|---|
| 3,687,713 A | 8/1972 | Adams |
| 4,645,712 A | 2/1987 | Ishigaki et al. |
| 5,614,327 A | 3/1997 | Morello |
| 6,387,453 B1 | 5/2002 | Brinker et al. |
| 6,540,844 B1 | 4/2003 | Crook |
| 2002/0010273 A1* | 1/2002 | Matsumura et al. .......... 525/100 |
| 2004/0131867 A1* | 7/2004 | Bier et al. ..................... 428/447 |

FOREIGN PATENT DOCUMENTS
EP 0 818 561 1/1998

OTHER PUBLICATIONS

Cai, Mei, et al. "Surface Vibrational Spectroscopy of Alkylsilane Layers Covalently Bonded to Monolayers of (3-Mercaptopropyl)trimethoxysilane on Ag Substrats", Langmuir, 2000, pp. 3446-3453, vol. 16.

\* cited by examiner

*Primary Examiner* — Ling Choi
*Assistant Examiner* — Chun-Cheng Wang
(74) *Attorney, Agent, or Firm* — Brinks, Hofer, Gilson & Lione

(57) ABSTRACT

The invention relates to a process for preparing a stable sol-gel solution. The solution may be used to form coating materials for metallic substrates, such as silver-based substrates for use in mirrors. The process includes the steps of preparing a sol-gel solution by bringing one or more molecular metal and/or metalloid precursors into contact with a medium comprising an organic solvent, adding at least one mercaptoorganosilane compound to the solution, hydrolyzing the solution obtained, and then adding one or more complexing agents to the solution.

23 Claims, 1 Drawing Sheet

PROCESS FOR PREPARING A SOL-GEL SOLUTION AND USE OF THIS SOLUTION TO FORM A COATING TO PROTECT A SUBSTRATE HAVING A METAL SURFACE

TECHNICAL FIELD

The invention relates to a process for preparing a stable sol-gel solution that is a precursor of a protective coating material for a substrate having a metal surface.

The invention also relates to a stable sol-gel solution capable of being obtained by this process.

This sol-gel solution is especially applicable for designing a coating on a metallic substrate, in order to improve the corrosion and oxidation resistance of such a surface. More specifically, this sol-gel solution is particularly effective for designing coatings on a silver-based substrate, such as are found in the silvered mirrors used, for example, in solar collectors or else in light reflectors.

PRIOR ART

Metallic substrates, and in particular those based on silver, such as mirrors, are very sensitive to the presence of impurities, such as hydrogen sulphide ($H_2S$), hydrochloric acid (HCl) or else ozone ($O_3$) in the atmosphere. In the long term, these impurities cause, in particular, tarnishing of these surfaces and a degradation in their optical performance over time.

Described in the prior art are many processes intended for protecting substrates, such as mirrors, from these signs of aging.

Thus, coating experts have thought to protect such substrates by coating them with a metal or metal alloy layer that is less sensitive to the environmental impurities than silver, while impairing the optical properties of this layer as little as possible.

Among the coating techniques involving metallization, mention may be made of chromium plating which consists in covering the silver-based substrate to be treated with a chromium film, by submerging said substrate in aqueous baths of chromium compounds. However, these days this technique is no longer used very much due to the restrictions on using chemical compounds based on chromium imposed by environmental regulations.

Mention may be made, as a variant, of techniques for depositing a coating based on noble metals such as gold or on non-noble metals such as tin, rhodium, copper, zinc or mixtures of these. Thus, document U.S. Pat. No. 5,614,327 describes the deposition on a silver substrate, by electroplating, of a coating made of an alloy based on copper, tin and zinc.

However, despite the excellent resistance of these metal coatings towards the corrosive impurities of the environment, these coatings generate significant losses of the optical properties of silver, especially in terms of specular reflectivity, in particular in the UV-visible range.

In order to get round the drawbacks ensuing from the use of metal coatings, some authors have had the idea of coating silver-based surfaces to be protected with a coating made of a transparent organic material. Thus, document U.S. Pat. No. 4,645,712 describes; the deposition of a coating based on an acrylic polymer. Such a deposition has however proved unstable over time, especially under intense luminous flux.

To solve the problem of stability over time, it has been envisaged in the prior art to use oxide ceramic coatings deposited by physical vacuum deposition processes, more commonly denoted by the term PVD (Physical Vapor Deposition). This is especially the case for document U.S. Pat. No. 3,687,713 which describes the PVD deposition of a coating based on alumina and silica. However, the deposition of an oxide ceramic coating by PVD requires expensive equipment which cannot be used on supports having a large size and/or a complex shape.

This is the reason for which the "soft chemistry" deposition processes and in particular the sol-gel deposition processes have appeared as an advantageous alternative to the physical vacuum deposition processes. Sol-gel deposition processes have, compared to the processes mentioned above, a number of advantages among which mention may be made of the deposition of a precursor solution of the coating, generally carried out at ambient temperature and at atmospheric pressure without recourse to a heat-treatment step at high temperatures, and deposition that can be envisaged on substrates of more diverse shapes or of large size.

An example of using the sol-gel technique to produce a coating for a silvered substrate is given in Patent Application EP 0818 561, in which, firstly, a sol-gel solution is prepared by dissolving a molecular silicon precursor and optionally a molecular precursor of aluminum or of titanium in an alcoholic solvent. Subsequently, the sol-gel solution is deposited on a substrate to be protected and heat-treated at a temperature ranging from 500 to 700° C.

However, the sol-gel processes for depositing coatings for silver-based substrates, developed to date, have revealed many drawbacks, among which mention may be made of:

instability over time of the sol-gel solutions used for the deposition, which is incompatible with the use of such solutions in an industrial context;

temperatures for treating the sol-gel solutions with a view to converting them to a ceramic that are much too high, which may impair the dimensional stability of the deposition substrates and that are incompatible with substrates that are intrinsically sensitive to high-temperature heat treatments;

properties of the materials obtained after densification of said solutions that are unsatisfactory from an optical point of view, especially the resistance of these materials to luminous flux;

properties of the materials obtained after densification of said solutions that are unsatisfactory from a chemical resistance point of view, preventing repeated cleaning of said materials by conventional washing agents and exposure of these materials to a polluted environment; and properties of the materials obtained after densification of said solutions that are unsatisfactory from a mechanical point of view, said coatings especially having poor adhesion to the silvered surface on which they are deposited.

The object of the invention is therefore to overcome the aforementioned drawbacks of the prior art and one subject thereof is especially a process for preparing a sol-gel solution, the operating conditions of which will be chosen so as to enable, at the end of the process, a sol-gel solution to be obtained that is stable over time, so as to make this process applicable on an industrial scale.

Another subject of the invention is a sol-gel solution capable of being obtained by this process, which other than its properties of stability over time makes it possible, after treatment, to obtain a coating material, in particular for a silver-based substrate, which has:

good adhesion to said substrate;
good chemical resistance towards environmental pollutants, such as sulfur-based compounds, and washing agents conventionally used to clean the surfaces; and
optical properties which do not lessen those of the underlying substrate.

A final subject of the invention is a process for preparing a coating material having the aforementioned advantages and the material obtained by this process.

SUMMARY OF THE INVENTION

Thus, the invention relates, according to the first subject, to a process for preparing a stable sol-gel solution comprising, in succession, the following steps:
a) preparing a sol-gel solution by bringing one or more molecular metal and/or metalloid precursors into contact with a medium comprising an organic solvent;
b) adding at least one mercaptoorganosilane compound to the solution obtained in a);
c) hydrolyzing the solution obtained in b); and
d) adding, to the solution obtained in c), one or more complexing agents chosen from:
carboxylic acids of formula $R^1$—COOH, in which $R^1$ represents a linear or branched alkyl group, comprising from 1 to 30 carbon atoms, preferably 1 to 10 carbon atoms, or a phenyl group;
β-diketones of formula $R^2$—COCH$_2$CO—$R^3$, in which $R^2$ and $R^3$ independently represent a linear or branched alkyl group, comprising from 1 to 30 carbon atoms, or a phenyl group; and
hydroxamates of formula $R^4$—CO—NHOH, in which $R^4$ represents an alkyl group comprising from 1 to 30 carbon atoms, preferably 1 to 10 carbon atoms, or a phenyl group.

The process of the invention advantageously makes it possible to obtain a stable sol-gel solution, that is to say a sol-gel solution having a viscosity stable over time. Owing to these carefully chosen operating conditions, the sol-gel solution obtained by the process of the invention may be used as a commercial solution, intended to be used subsequently with a view to being converted to a hybrid organic/inorganic material. Due to its long-term stability, the sol-gel solution obtained at the end of this process makes it possible to obtain, after treatment, hybrid organic/inorganic materials having identical properties from a same solution used at various stages of aging.

Firstly, the process of the invention comprises a step of preparing a sol-gel solution by bringing one or more molecular metal and/or metalloid precursors into contact with a medium comprising an organic solvent.

The metal may be chosen from a group formed of transition metals, lanthanide metals and metals known as post-transition metals from columns IIIA and IVA of the Periodic Table of the Elements. The transition metal element may be chosen from Ti, V, Cr, Mn, Fe, Co, Ni, Cu, Zn, Y, Zr, Nb, Mo, Ru, Rh, Pd, Ag, Cd, Hf, Ta, W, Re, Os, Ir, Pt. The lanthanide element may be chosen from La, Ce, Pr, Nd, Sm, Eu, Gd, Tb, Dy, Er, Yb. The post-transition metal element may be chosen from the group IIIA elements Al, Ga, In and Tl and the group IVA elements Ge, Sn and Pb.

The metalloid element is advantageously chosen from Si, Se or Te.

It may also be any combination of transition metals, lanthanide metals, post-transition metals and metalloids.

The molecular metal or metalloid precursors may be in the form of inorganic metal or metalloid salts such as halides (fluorides, chlorides, bromides, iodides), nitrates or oxalates.

The molecular metal or metalloid precursors may also be in the form of organometallic metal or metalloid compounds, such as:
alkoxides corresponding to the formula (RO)$_n$M, characterized in that M denotes the metal or metalloid, n represents the number of ligands linked to M, this number also corresponding to the degree of oxidation of M, and R represents a linear or branched alkyl group possibly comprising from 1 to 10 carbon atoms, or a phenyl group;
organometallic compounds corresponding to the following formula:

$$X_y R^5_z M$$

in which:
M represents a metal or metalloid;
X represents a hydrolyzable group such as a halogen group, an acetate group, an acetonate group, an acrylate group, an acetoxy group, an acryloxy group, an OR' alcololate group with R' representing a linear or branched alkyl group comprising from 1 to 10 carbon atoms, or a phenyl group;
$R^5$ represents a ligand derived from:
a carboxyl compound of formula $R^6$—COOH with $R^6$ representing a linear or branched alkyl group comprising from 1 to 30 carbon atoms, preferably from 1 to 10 carbon atoms, or a phenyl group;
a β-diketone compound $R^7$—CO—CH$_2$—CO—$R^8$ with $R^7$ and $R^8$, which are identical or different, representing a linear or branched alkyl group comprising from 1 to 30 carbon atoms, preferably from 1 to 10 carbon atoms, or a phenyl group;
a phosphonate compound of formulae $R^9$—PO(OH)$_2$, $R^{10}$—PO (OR$^{11}$) (OH) or $R^{12}$—PO(OR$^{13}$) (OR$^{14}$) in which $R^9$, $R^{10}$, $R^{11}$, $R^{12}$, $R^{13}$ and $R^{14}$, which are identical or different, represent a linear or branched alkyl group comprising from 1 to 30 carbon atoms, preferably from 1 to 10 carbon atoms, or a phenyl group;
a hydroxamate compound of formula $R^{15}$—CO(NHOH) in which $R^{15}$ represents a linear or branched alkyl group comprising from 1 to 30 carbon atoms, preferably from 1 to 10 carbon atoms, or a phenyl group;
an organosilane compound, a sulphonate compound, a borate compound or a compound of formula HO—$R^{16}$—OH, in which $R^{16}$ represents a linear or branched alkylene group comprising from 1 to 30 carbon atoms, preferably from 1 to 10 carbon atoms, or a phenylene group; and
x and y being positive integers chosen so that (x+y) is equal to the valency of M.

Preferably, the metal or metalloid precursors are metal or metalloid alkoxides.

In particular, when the metalloid is silicon, the silicon precursor may be a silicon alkoxide such as tetraethylorthosilicate Si(OCH$_2$CH$_3$)$_4$ or tetramethyl-orthosilicate Si(OCH$_3$)$_4$.

The molecular metal or metalloid precursors as described above are brought into contact with a medium comprising an organic solvent, so as to form a sol-gel solution.

Preferably, the organic solvent is chosen from:
saturated or unsaturated, aliphatic or aromatic monoalcohols of formula $R^{17}$—OH, in which $R^{17}$ represents a linear or branched alkyl group comprising from 1 to 30 carbon atoms, preferably from 1 to 10 carbon atoms, or a phenyl group; and diols of formula HO—$R^{18}$—OH, in which $R^{18}$ represents a linear or branched alkylene group comprising from 1 to 30 carbon atoms, preferably from 1 to 10 carbon atoms, or a phenylene group.

As examples of diols, mention may be made of ethylene glycol, diethylene glycol or else triethylene glycol.

In the case where the molecular precursor is a molecular silicon precursor, the preferred solvent used to dissolve this precursor and form a sol-gel solution is ethanol.

According to the invention, once the sol-gel solution is prepared according to step a), a mercaptoorganosilane compound is added thereto that advantageously corresponds to the following formula:

$(HS—R^{19})_x SiR^{20}_{y'} X^{1}_{(4-x'-y')}$ in which:
- $R^{19}$ represents a linear or branched divalent hydrocarbon-based group comprising from 1 to 30 carbon atoms, preferably from 1 to 10 carbon atoms, or a phenylene group;
- $R^{20}$ represents a linear or branched monovalent hydrocarbon-based group comprising from 1 to 30 carbon atoms, preferably from 1 to 10 carbon atoms;
- $X^1$ represents a hydrolyzable group chosen from a halogen, an acetonate, an acrylate, an alcoholate of formula $OR^{21}$ in which $R^{21}$ represents an alkyl group comprising from 1 to 10 carbon;
- x' is an integer equal to 1 or 2;
- y' is an integer equal to 0, 1 or 2; and
- the sum of x' and y' being at the maximum equal to 3.

Preferably, $X^1$ is an $OR^{21}$ group as defined above.

The $R^{19}$ group may be, for example, a linear or branched alkylene group comprising from 1 to 30 carbon atoms, preferably from 1 to 10 carbon atoms. As examples of such groups, mention may be made of methylene, ethylene, propylene, n-butylene, isobutylene, hexylene, 2-ethylhexylene, n-octylene and decylene.

The $R^{19}$ group may also be an arylene group comprising from 6 to 20 carbon atoms, such as phenylene or naphtylene.

Finally, the $R^{19}$ group may be an alkarylene group such as xylylene, tolylene; a cycloalkylene group comprising from 4 to 20 carbon atoms such as cyclopentylene, cyclohexylene, cyclobutylene; an aralkylene group such as 2-phenylpropylene, phenylethylene, benzylene.

Preferably, the $R^{19}$ group is an alkylene group comprising from 1 to 10 carbon atoms.

The $R^{20}$ group may be a linear or branched alkyl group comprising from 1 to 30 carbon atoms, such as a methyl, ethyl, propyl, isopropyl, butyl, octyl, 2-ethylhexyl or octadecyl group. The $R^{20}$ group may also be a cycloalkyl group comprising from 3 to 20 carbon atoms, such as the cyclopentyl group or the cyclohexyl group. The $R^{20}$ group may also be an aryl group comprising from 5 to 20 carbon atoms, such as the phenyl, naphthyl or p-phenylphenyl group; an alkaryl group such as a tolyl or xylenyl group; an aralkyl group such as a benzyl group, a phenylethyl group or naphthylbutyl group.

Preferably, $R^{20}$ is a linear or branched alkyl group comprising from 1 to 10 carbon atoms, or a phenyl group.

Preferably, according to the invention mercaptoorganosilane compounds are used that correspond to the following formula:

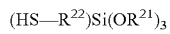

$(HS—R^{22})Si(OR^{21})_3$ in which $R^{21}$ represents an alkyl group comprising from 1 to 10 carbon atoms and $R^{22}$ represents an alkylene group comprising from 1 to 10 carbon atoms.

One particular compound corresponding to the definition given above is (3-mercaptopropyl)trimethoxysilane $HSCH_2CH_2CH_2Si(OCH_3)_3$.

The mercaptoorganosilane compound may be added, to the previously prepared sol-gel solution, directly in pure form or in a diluted form, preferably in an organic solvent identical to that used for preparing the sol-gel solution of step a).

The mercaptoorganosilane compound is advantageously added to the previously prepared sol-gel solution in an amount which may range from 1 to 50% by weight relative to the total weight of the molecular metal and/or metalloid precursor(s) used in step a), preferably from 1 to 12%, and more specifically equal to 5% by weight.

This mercaptoorganosilane compound has the role of ensuring, during the deposition of the sol-gel solution obtained at the end of the process, a strong interaction between the preferably metallic deposition surface and the layer derived from the solution. This compound especially helps to strengthen the abrasion resistance of the coating material obtained after densification of the deposited layer.

The solution obtained at the end of step b) is made to undergo, according to the invention, a hydrolysis. This hydrolysis is generally carried out by adding a controlled amount of water, preferably deionized and optionally acidified water, to the solution. This hydrolysis may be carried out by adding a solution comprising the solvent used in step a) and optionally step b) and water, preferably deionized and optionally acidified water, to the solution.

A person skilled in the art will choose, in a suitable manner, the hydrolysis conditions (amount of water added, pH) depending on the nature and the reactivity of the molecular metal and/or metalloid precursor(s).

Advantageously, the controlled amount of water to be added (whether it is in the form of water alone or in the form of a solution as mentioned above) will be determined so as to obtain a degree of hydrolysis ranging from 0.1 to 15, the degree of hydrolysis representing the molar ratio between the water added and the molecular precursors present in the solution obtained in a).

This step is necessary to carry out the hydrolysis of the precursors and of the mercaptoorganosilane compound and thus to form a metal or metalloid and silicon oxyhydroxide network.

In particular, when the solution obtained comprises a molecular silicon precursor, such as tetraethylorthosilicate, and a mercaptoorganosilane compound, the controlled hydrolysis step will be carried out, preferably, by addition of an aqueous HCl or $HNO_3$ acid solution, at a pH which may range from 1 to 6, and with a degree of hydrolysis which may range from 1 to 10.

After the hydrolysis, added to the sol-gel solution are, according to the invention, one or more complexing agents chosen from carboxylic acids, β-diketones or hydroxamate compounds as defined above.

The carboxylic acids generally correspond, according to the invention, to the formula $R^1$—COOH, in which $R^1$ represents a linear or branched alkyl group comprising from 1 to 30 carbon atoms, preferably from 1 to 10 carbon atoms, or a phenyl group. Examples of suitable carboxylic acids are acetic acid, propionic acid, butyric acid, valeric acid, isovaleric acid, hexanoic acid, heptanoic acid, octanoic acid, nonanoic acid, decanoic acid, undecanoic acid, lauric acid, tridecanoic acid, myristic acid and lactic acid. Preferably, acetic acid will be chosen.

The β-diketone compounds generally correspond, according to the invention, to the formula $R^2$—CO—$CH_2$—CO—R, in which $R^2$ and $R^3$, which are identical or different, represent an alkyl group comprising from 1 to 30 carbon atoms or a phenyl group. Examples of suitable β-diketone compounds are acetylacetone and derivatives thereof.

As examples of hydroxamate compounds, mention may be made of acetohydroxamic acid.

The complexing agent or agents are advantageously added in an amount that makes it possible to obtain a degree of complexation ranging from 1 to 20, this degree of complexation being defined as the molar ratio between the complexing agent or agents added and the molecular precursor or precursors present in solution a).

The addition of these complexing agents has the effect of stabilizing the sol-gel solution obtained after hydrolysis.

The solution obtained after addition of the complexing agents may be, optionally, diluted with an organic solvent identical to that used in step a), which may further help to improve the stability of the sol-gel solution obtained at the end of the process of the invention. The degree of dilution may be spread from 1 to 5% by weight.

The sol-gel solutions obtained at the end of this step are clear and transparent and remain stable over at least 4 months, that is to say that, during this period, the coating stemming from this treating solution has the same protective properties as with a freshly synthesized treating solution. These sol-gel solutions thus have the advantage of being able to be used for several months.

Thus, another subject of the invention is a sol-gel solution capable of being obtained by the process as described above.

According to one particular embodiment of the invention, when the molecular precursor is a silicon precursor, the process of the invention advantageously comprises the following steps:
 preparing a sol-gel solution by bringing a molecular silicon precursor, such as tetraethylorthosilicate Si($OCH_2CH_3$)$_4$, into contact with an aliphatic alcoholic solvent, such as ethanol;
 adding to the solution obtained above a mercaptoorganosilane compound, such as (3-mercaptopropyl)trimethoxysilane;
 hydrolyzing the solution obtained above by adding an acidic aqueous solution, in an amount such that the degree of hydrolysis ranges from 1 to 15, for example from 1 to 10, preferably is equal to 5;
 adding to the hydrolyzed solution obtained above a complexing agent of the carboxylic acid type, such as acetic acid, in an amount such that the molar degree of complexation ranges from 1 to 20, preferably is equal to 4; and
 diluting the complexed solution obtained above, for example to 4% by weight $SiO_2$ equivalent, with an alcoholic solvent identical to that used in the first step, this solvent preferably being ethanol.

The sol-gel solutions are capable, after deposition on a substrate, in particular a metallic substrate, such as a silver-based substrate, and treatment of said deposited solution, of giving a coating material which has the following advantageous properties:
 good adhesion to said surface;
 good chemical resistance to environmental pollutants, such as sulphur-based compounds, and washing agents conventionally used to clean surfaces, for example a mirror; and
 optical properties that do not reduce those of the underlying substrate.

Thus, another subject of the invention is a process for preparing a coating material from said sol-gel solution prepared according to the invention, said process comprising in succession, the following steps:
 depositing at least one layer of a sol-gel solution as prepared according to the process described above; and
 crosslinking/densifying said deposited layer or layers.

Thus, according to the invention, the solution is deposited on a substrate in the form of one or more layers.

Preferably, the substrate is a metallic substrate, more particularly a silver-based substrate.

This solution may be deposited according to various deposition techniques, among which mention may be made of:
 dip coating;
 spin coating;
 laminar-flow coating or meniscus coating;
 spray coating;
 slip coating;
 roll coating or roll-to-roll process;
 brush coating or paint coating;
 screen printing; and
 tape coating.

Preferably, the layer or layers of solution is (are) deposited by dip coating or spin coating.

After being deposited, the layer of sol-gel solution is made to undergo, according to the invention, a crosslinking/densifying treatment intended to convert said layer into an oxide material especially comprising -M-O—Si— and —Si—O—Si— bonds, M corresponding to the same definition as given above.

According to the invention, this crosslinking/densifying step may be carried out, in particular, by a heat treatment at a moderate, not very high temperature of, for example, 100° C. to 300° C., preferably around 200° C., in air or in an inert gas (such as nitrogen and/or argon), for a length of time which may range from 2 to 150 minutes, preferably from 15 to 60 minutes, for example at 200° C. for 30 minutes.

This crosslinking/densifying step may also be carried out by exposure to infrared rays. The radiation makes it possible to heat the deposited layer to a temperature ranging from 120 to 300° C., preferably around 200° C., in air and/or in an inert gas. Preferably, the infrared radiation is maintained for a length of time ranging from 2 to 150 minutes, preferably from 12 to 60 minutes, for example at 200° C. for 30 minutes. This technique, when it is used with a silver substrate, such as a mirror, has the advantage of not generating a significant temperature rise in the substrate due to the highly reflective properties of silver in the infrared spectral range.

According to one variant of the invention, the crosslinking/densifying step may be carried out by exposure of the deposited layer to UV rays, for example at a wavelength ranging from 180 to 350 nm. Practically, the exposure to UV rays is carried out by subjecting the deposited layer to the radiation from a UV lamp, for example a mercury-vapor lamp or an excimer lamp. Said UV exposure is generally carried out with an energy ranging from 5 to 10 J/cm$^2$, preferably from 5 to 6 J/cm$^2$, for a length of time ranging from 10 seconds to 10 minutes, preferably from 30 seconds to 5 minutes.

Finally, the crosslinking/densifying step may be carried out by any other crosslinking method that makes it possible to achieve the desired crosslinking at ambient temperature or at a moderate temperature (that is to say a temperature below 300° C.).

Crosslinking techniques, such as laser-beam, electron-beam or ion-beam irradiation or else irradiation by microwave energy may also be envisaged.

It should be noted that, before depositing of the sol-gel solution on the substrate, the latter may advantageously be subjected to a surface treatment intended to improve the adhesion of the layer of sol-gel solution to the substrate.

This surface treatment may consist, for example, of surface cleaning with an acidic aqueous solution, such as an aqueous solution comprising orthophosphoric acid followed by rinsing and drying of said surface.

An effective surface treatment solution, especially when the substrate is a silver-based substrate, is an aqueous solution of a strong acid, such as a solution of orthophosphoric acid, to which thiourea has been added.

The coating material obtained according to the invention advantageously forms a protective material for metallic substrates, especially silver-based substrates, such as mirrors, which especially makes it possible to protect the substrates against environmental pollutants while maintaining their optical properties and having excellent mechanical properties, such as excellent abrasion resistance. This coating material is in the form of a solid material having M-O—Si and Si—O—Si bonds and also organic Si—R—SH bonds (from the mercaptoorganosilane compound), this material possibly thus being qualified as a hybrid organic/inorganic material. The Si—R—SH groups in particular enable an excellent adhesion to metallic substrates.

The invention thus also relates to a metallic substrate, especially a silver-based substrate, completely or partly coated with a layer made of a coating material as defined above and to a mirror comprising such a substrate.

For this type of application, the layer of coating material as defined above will advantageously have a thickness which may range from 10 to 500 nm, preferably from 100 to 200 nm, for example 150 nm.

A final subject of the invention is the use of a material as defined above for protecting a silver-based substrate, in particular a mirror.

It is specified that, the expression "silver-based substrate" is generally understood according to the invention to mean a substrate of metallic, mineral or organic nature, at least one of the sides of which is coated with a layer of silver, having a thickness which may range from 0.1 μm to a few hundred micrometers or else a solid silver substrate.

The coating materials of the invention used as protective materials for a silver-based surface of a mirror have the following advantages:

- an exceptional protective effect in an oxidizing atmosphere;
- a good resistance to the luminous flux of illuminating flash lamps;
- a mechanical strength defined by a "moderate" abrasion resistance according to the US-MIL-A-A-133-C standard characterized by an absence of damage to the coating material layer after 50 passes;
- an adhesion defined by a bond strength according to the US-MIL-C-0675-C standard characterized by an absence of damage to the coating material layer after peeling off a standardized adhesive tape; and
- a chemical resistance characterized by a resistance to current cleaning products, to acids, bases and organic solvents (such as acetone or ethanol).

Particularly effective materials are those manufactured from a sol-gel solution obtained by the process comprising the following successive steps:

- preparing a sol-gel solution by bringing a molecular silicon precursor, such as tetraethylorthosilicate $Si(OCH_2CH_3)_4$, into contact with an aliphatic alcoholic solvent, such as ethanol;
- adding to the solution obtained above a mercaptoorganosilane compound, such as (3-mercaptopropyl)trimethoxysilane;
- hydrolyzing the solution obtained above by adding an acidic aqueous solution, in an amount such that the degree of hydrolysis ranges from 1 to 15, preferably from 3 to 10, more preferably is equal to 5;
- adding to the hydrolyzed solution obtained above a complexing agent of the carboxylic acid type, such as acetic acid, in an amount such that the degree of complexation ranges from 1 to 20, preferably from 3 to 20, more preferably is equal to 4;
- diluting the complexed solution obtained above with an aliphatic alcoholic solvent identical to that used in the first step, this solvent preferably being ethanol;
- depositing said sol-gel solution on a substrate; and
- making said deposited sol-gel solution undergo a crosslinking/densifying treatment to give a material based on $SiO_2$.

The invention will now be described with reference to the following example given by way of illustration and nonlimitingly.

DETAILED SUMMARY OF PARTICULAR EMBODIMENTS

This example illustrates the preparation of a coating material intended for a silvered surface of a reflector.

The preparation of such a material comprises:
- the preparation of the material precursor sol-gel solution and preparation of the silvering surface; and
- the deposition of said solution followed by a crosslinking/densifying treatment.

a) Preparation of the Material Precursor Sol-gel Solution

Placed in a three-necked flask were tetraethylorthosilicate $Si(OCH_2CH_3)_4$ in absolute ethanol, the amount of tetraethylorthosilicate being 51.3% by weight relative to the total weight of the resulting solution. This solution was stirred until the tetraethylorthosilicate had dissolved. Next, 3-mercaptopropyltrimethoxysilane $HS-(CH_2)_3-Si(OCH_3)_3$ was added to the solution, the amount of 3-mercaptopropyltrimethoxysilane being 5% by weight relative to the weight of tetraethylorthosilicate. The resulting solution was stirred for 30 minutes. When the 3-mercaptopropyltrimethoxysilane had completely dissolved in the solution, a solution was added that comprised an aqueous solution of hydrochloric acid (pH=1) and absolute ethanol in the amounts 53.3/46.7, the amount of the stirred solution being determined so as to have a degree of hydrolysis of 5, said degree of hydrolysis corresponding to the ratio of the number of moles of water added to the number of moles of tetraorthosilicate. The hydrolyzed solution was stirred magnetically for 3 hours, then left at room temperature without stirring for 21 hours. Acetic acid was added, in an amount that made it possible to obtain a degree of complexation of 4, said degree of complexation corresponding to the ratio of the number of moles of acetic acid added to the number of moles of tetraethylorthosilicate. After stirring magnetically for 3 h, the solution was diluted with absolute ethanol to around 4% by weight of $SiO_2$ equivalent.

b) Deposition of the Sol-gel Solution on a Silver-Based Substrate

Figure 1:
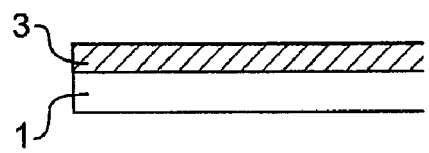
FIG. 1 is a longitudinal cross-sectional view of a metallic substrate coated on one of the sides with a layer made from a coating material according to the invention.

The deposition substrate was a square metallic substrate made of stainless steel (referenced 1 in FIG. 1) having sides of 5 cm and covered with a silver layer of thickness 10 μm produced by electroplating.

Before the deposition, this substrate was submerged for 2 minutes in a surface treatment solution comprising:
  an 84% aqueous solution of orthophosphoric acid ($H_3PO_4$);
  3.8 wt % of thiourea $H_2NCSNH_2$; and
  0.5 wt % of Triton*100.

The substrate was then removed from the surface treatment solution, rinsed with plenty of deionized water, then dried using absolute ethanol.

Next, the deposition was carried out by dip-coating a layer of sol-gel solution, the preparation of which is explained in paragraph a) above. In order to do this, the substrate was submerged in the solution. After stabilizing for one minute, the substrate was removed from the solution with a constant removal rate of around 25 cm/min. After drying for two minutes at ambient temperature and atmospheric pressure, a homogeneous sol-gel layer covered the silver surface of the stainless steel substrate.

The layer of sol-gel solution thus obtained was then densified by exposure to infrared radiation in air enabling the layer covering the silver surface to be heated at 200° C. for 30 minutes, at the end of which a layer made of a coating material (referenced 3 in FIG. 1) was obtained that had a thickness of around 140 nm.

Figure 2:
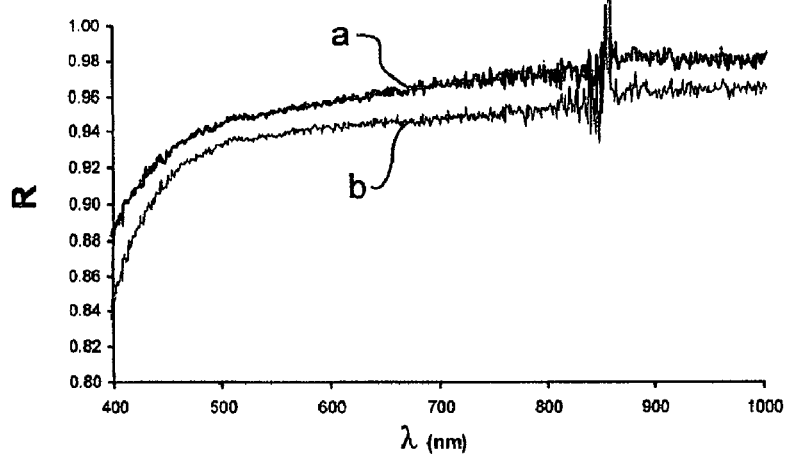
FIG. 2 shows a graph representing the value of the specular reflection (R) at 8° as a function of the wavelength (λ) in nm for a stainless-steel substrate coated with a layer of silver, itself coated with a layer of coating material according to the invention.
Figure 3:
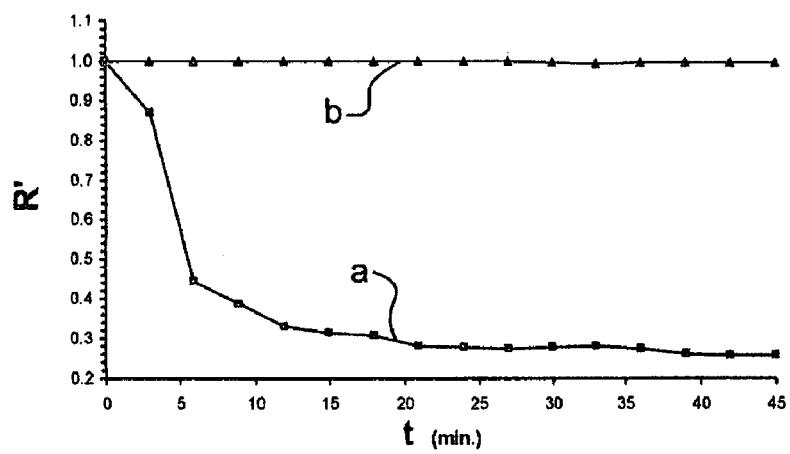
FIG. 3 shows a graph representing the value of the average relative specular reflection (R') between 400 and 1000 nm as a function of the exposure time in a UV-ozone oven (t) for a stainless steel substrate coated with a silver layer, itself coated with a layer of coating material according to the invention.
Figure 4:
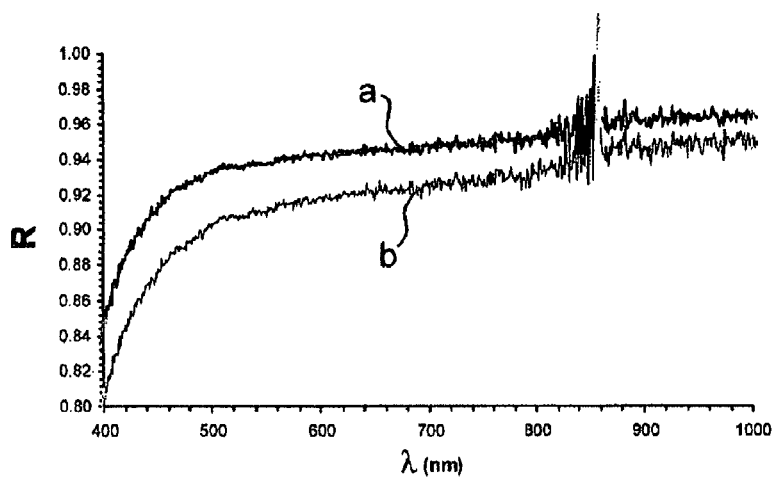
FIG. 4 shows a graph representing the value of the specular reflection (R) at 8° as a function of the wavelength (λ) in nm and after 10,000 flash lamp firings for a stainless steel substrate coated with a silver layer, itself coated with a layer of coating material according to the invention.

The coating material was the subject of spectral analyses so as to determine its properties, the results of these analyses being recorded in FIGS. 2 to 4.

A first analysis, whose results are given in FIG. 2, consisted in measuring the specular reflection values as a function of the wavelength respectively for:
  a stainless steel substrate as defined above that was not coated with a coating material according to the invention (line a in FIG. 2); and
  a stainless steel substrate as defined above coated with a coating material according to the invention, the preparation of which is explained above (line b in FIG. 2).

In view of lines a) and b) in FIG. 2, there appears to be a very small loss of the specular reflection, which demonstrates that the layer of coating material of the invention does not impair the specular reflection properties of the underlying silver surface.

These results make it possible to demonstrate that the coating materials of the invention allow the specular reflection properties of a silver surface to be protected.

A second analysis, whose results are given in FIG. 3, consisted in measuring, for different wavelengths ranging from 400 to 1000 nm, the values of specular reflection at 8° in a very corrosive atmosphere in a UV-ozone oven respectively for:
  a stainless steel substrate as defined above that was not coated with a coating material according to the invention (line a in FIG. 3); and
  a stainless steel substrate as defined above, coated with a coating material according to the invention, the preparation of which is explained above (line b in FIG. 3).

In FIG. 3, it appears that for the stainless steel substrate coated with a layer of coating material, the average relative specular reflection is unchanged over the 45 minutes of exposure, whereas, for the substrate not coated with a coating material, the average relative specular reflection decreased very significantly after 5 minutes of exposure.

These results make it possible to demonstrate the protective effect of the coating material according to the invention under highly corrosive conditions.

A third analysis, the results of which are given in FIG. 4, consisted in measuring, for a substrate coated with a coating material according to the invention, the specular reflection R as a function of the wavelength ($\lambda$) before and after exposure to the luminous flux of flash lamps (10,000 firings with a flux density of 25 kW/m$^2$ in the visible range).

It is observed that the substrate coated with a coating material according to the invention (line b in the figure) maintains a high level of reflection after exposure and a very low loss of reflection compared to the uncoated substrate (line a in FIG. 4).

Furthermore, other tests intended to highlight the chemical resistance properties and the mechanical properties of the coating materials of the invention have also been carried out.

From these tests, it emerges that the substrates coated with a coating material according to the invention are inert to strong acids, 12M HCl, to pure acetic acid, to bases, 1M NaOH, to a 28% ammonia solution, to conventional soaps and to organic solvents, such as alcohols and acetone.

It also emerges that the coating materials of the invention are resistant to laboratory adhesive and adhesive-tape peel tests. They are also not damaged by the "moderate" test of the US-MIL-C-0675-C standard, that is to say after 50 passes with a pressure of 1 lb.

The invention claimed is:

1. A process for preparing a stable sol-gel solution to be coated on a metallic substrate comprising, in succession, the following steps:
  a) preparing a sol-gel solution by bringing one or more molecular metal and/or metalloid precursors into contact with a medium comprising an organic solvent;
  b) adding at least one mercaptoorganosilane compound to the solution obtained in a);
  c) hydrolyzing the solution obtained in b); and
  d) adding to the solution obtained in c), one or more complexing agents chosen from:
    (i) carboxylic acids of formula $R^1$—COOH, wherein $R^1$ represents a linear or branched alkyl group comprising from 1 to 30 carbon atoms, or a phenyl group;
    (ii) β-diketones of formula $R^2$—COCH$_2$CO—$R^3$, wherein $R^2$ and $R^3$ independently represent a linear or branched alkyl group comprising from 1 to 30 carbon atoms, or a phenyl group; or (iii) hydroxamates of formula R⁴—CO—NHOH, wherein R⁴ represents an alkyl group comprising from 1 to 30 carbon atoms, or a phenyl group,
wherein the stable sol-gel solution is effective to coat the metallic substrate.

2. The process for preparing a sol-gel solution as claimed in claim 1, wherein the molecular metal precursor is a molecular precursor chosen from transition metal, lanthanide metal, or post-transition metal precursors.

3. The process for preparing a sol-gel solution as claimed in claim 2, wherein the transition metal is chosen from Ti, V, Cr, Mn, Fe, Co, Ni, Cu, Zn, Y, Zr, Nb, Mo, Ru, Rh, Pd, Ag, Cd, Hf, Ta, W, Re, Os, Ir, or Pt.

4. The process for preparing a sol-gel solution as claimed in claim 2, wherein the lanthanide metal is chosen from La, Ce, Pr, Nd, Sm, Eu, Gd, Tb, Dy, Er, or Yb.

5. The process for preparing a sol-gel solution as claimed in claim 2, wherein the post-transition metal is chosen from group IIIA elements Al, Ga, In, and Tl or group IVA elements Ge, Sn, and Pb.

6. The process for preparing a sol-gel solution as claimed in claim 1, wherein the molecular metalloid precursor is a molecular precursor of silicon, selenium, or tellurium.

7. The process for preparing a sol-gel solution as claimed in claim 1, wherein the molecular metal or metalloid precursor is an inorganic metal or metalloid salt.

8. The process for preparing a sol-gel solution as claimed in claim 1, wherein the one or more molecular metal and/or metalloid precursor is an alkoxide corresponding to the formula $(RO)_nM$, wherein M denotes the metal or metalloid, n represents the number of ligands linked to M, this number also corresponding to the degree of oxidation of M, and R represents a linear or branched alkyl group comprising from 1 to 10 carbon atoms, or a phenyl group.

9. The process for preparing a sol-gel solution as claimed in claim 1, wherein the molecular metal or metalloid precursor corresponds to the following formula:

$$X_y R^5_z M$$

wherein:
M represents a metal or metalloid;
X represents a hydrolyzable group;
R⁵ represents a ligand derived from:
a carboxyl compound of formula R⁶—COOH with R⁶ representing a linear or branched alkyl group comprising from 1 to 30 carbon atoms or a phenyl group;
a β-diketone compound R⁷—CO—CH₂—CO—R⁸ with R⁷ and R⁸, which are identical or different, representing a linear or branched alkyl group comprising from 1 to 30 carbon atoms, or a phenyl group;
a phosphonate compound of formulae R⁹—PO(OH)₂, R¹⁰—PO(OR¹¹)(OH) or R¹²—PO(OR¹³)(OR¹⁴) wherein R⁹, R¹⁰, R¹¹, R¹², R¹³ and R¹⁴, which are identical or different, represent a linear or branched alkyl group comprising from 1 to 30 carbon atoms or a phenyl group;
a hydroxamate compound of formula R¹⁵—CO(NHOH) wherein R¹⁵ represents a linear or branched alkyl group comprising from 1 to 30 carbon atoms or a phenyl group; or
an organosilane compound, a sulphonate compound, a borate compound or a compound of formula HO—R¹⁶—OH, wherein R¹⁶ represents a linear or branched alkylene group comprising from 1 to 30 carbon atoms or a phenylene group;
wherein y and z are positive integers chosen such that (y+z) is equal to the valency of M.

10. The process for preparing a stable sol-gel solution as claimed in claim 9, wherein the hydrolyzable group X is a halogen group, an acetate group, an acetonate group, an acrylate group, an acryloxy group, or an alcoholate group OR', with R' representing a linear or branched alkyl group comprising from 1 to 10 carbon atoms or a phenyl group.

11. The process for preparing a sol-gel solution as claimed in claim 1, wherein the organic solvent used in step a) is chosen from:
saturated or unsaturated, aliphatic or aromatic monoalcohols of formula R¹⁷—OH, wherein R¹⁷ represents a linear or branched alkyl group comprising from 1 to 30 carbon atoms or a phenyl group; or
diols of formula HO—R¹⁸—OH, wherein R¹⁸ represents a linear or branched alkylene group comprising from 1 to 30 carbon atoms or a phenylene group.

12. The process for preparing a sol-gel solution as claimed in claim 1, wherein the mercaptoorganosilane compound corresponds to the following formula:

$$(HS—R^{19})_{x'}SiR^{20}_{y'}X^1_{(4-x'-y')}$$

wherein:
R¹⁹ represents a linear or branched divalent hydrocarbon-based group comprising from 1 to 30 carbon atoms or a phenylene group;
R²⁰ represents a linear or branched monovalent hydrocarbon-based group comprising from 1 to 30 carbon atoms;
X¹ represents a hydrolyzable group chosen from a halogen, an acetonate, an acrylate, an alcoholate of formula OR²¹ wherein R²¹ represents an alkyl group comprising from 1 to 10 carbon atoms;
x' is an integer equal to 1 or 2;
y' is an integer equal to 0, 1 or 2; and
the sum of x' and y' being at the maximum equal to 3.

13. The process for preparing a sol-gel solution as claimed in claim 12, wherein the mercaptoorganosilane compound corresponds to the following formula:

$$(HS—R^{22})Si(OR^{21})_3$$

wherein R²¹ represents an alkyl group comprising from 1 to 10 carbon atoms and R²² represents an alkylene group comprising from 1 to 10 carbon atoms.

14. The process for preparing a sol-gel solution as claimed in claim 1, wherein the mercaptoorganosilane compound is added in an amount ranging from 1 to 50% by weight relative to the total weight of the molecular metal and/or metalloid precursor(s) used in step a).

15. The process for preparing a sol-gel solution as claimed in claim 1, wherein the hydrolysis step is carried out by addition of an aqueous solution or a solution comprising the solvent used in step a) and water.

16. The process for preparing a sol-gel solution as claimed in claim 15, wherein the hydrolysis step takes place at an acid pH.

17. The process for preparing a sol-gel solution as claimed in claim 15, wherein the water is added in an amount determined so as to obtain a degree of hydrolysis ranging from 0.1 to 15, the degree of hydrolysis representing the molar ratio between the water added and the molecular precursor(s) present in the solution obtained in a).

18. The process for preparing a sol-gel solution as claimed in claim 1, wherein the carboxylic acids are chosen from acetic acid, propionic acid, butyric acid, valeric acid, isovaleric acid, hexanoic acid, heptanoic acid, octanoic acid, nonanoic acid, decanoic acid, undecanoic acid, lauric acid, tridecanoic acid, myristic acid, or lactic acid.

19. The process for preparing a sol-gel solution as claimed in claim 1, wherein the β-diketone compound is acetyl acetone.

20. The process for preparing a sol-gel solution as claimed in claim 1, wherein the complexing agent or agents are added in an amount to obtain a degree of complexation ranging from 1 to 20, this degree of complexation being defined as the molar ratio between the complexing agent or agents added and the molecular precursor or precursors from step a).

21. The process for preparing a sol-gel solution as claimed in claim 1, further comprising after step d), a step of diluting with an organic solvent identical to that used in step a).

22. The process for preparing a sol-gel solution as claimed in claim 1, comprising the following steps:

(a) preparing a sol-gel solution by bringing tetraethylorthosilicate $Si(OCH_2CH_3)_4$, into contact with ethanol;
(b) adding to the sol-gel solution obtained in step (a), (3-mercaptopropyl)trimethoxysilane;
(c) hydrolyzing the solution obtained above by adding an acidic aqueous solution, in an amount such that the degree of hydrolysis ranges from 1 to 15;
(d) adding to the hydrolyzed solution obtained above a complexing agent of acetic acid, in an amount such that the degree of complexation ranges from 1 to 20; and
(e) diluting the complexed solution obtained in step (d) with ethanol.

23. A sol-gel solution obtained by the process as defined in claim 1.

* * * * *